(12) United States Patent
Nanjo et al.

(10) Patent No.: US 7,982,973 B2
(45) Date of Patent: Jul. 19, 2011

(54) ZOOM LENS, LENS BARREL AND IMAGE PICKUP APPARATUS

(75) Inventors: Yusuke Nanjo, Kanagawa (JP); Takashi Koyama, Tokyo (JP)

(73) Assignee: Sony Corporation, Tokyo (JP)

( * ) Notice: Subject to any disclaimer, the term of this patent is extended or adjusted under 35 U.S.C. 154(b) by 228 days.

(21) Appl. No.: 12/457,357

(22) Filed: Jun. 9, 2009

(65) Prior Publication Data
US 2010/0020410 A1 Jan. 28, 2010

(30) Foreign Application Priority Data
Jul. 25, 2008 (JP) ................................. 2008-192364

(51) Int. Cl.
*G02B 9/00* (2006.01)
(52) U.S. Cl. ...................... 359/738; 359/740; 396/461
(58) Field of Classification Search .......... 359/738–740; 396/461
See application file for complete search history.

(56) References Cited

U.S. PATENT DOCUMENTS
5,790,316 A * 8/1998 Terasawa et al. ............. 359/687

FOREIGN PATENT DOCUMENTS
| JP | 2000-221399 | 8/2000 |
| JP | 2005-181556 | 7/2005 |
| JP | 2007-248770 A | 9/2007 |
| JP | 2007-264381 | 10/2007 |

OTHER PUBLICATIONS

Japanese Office Action issued Nov. 25, 2010 for corresponding Japanese Application 2008-192364.

* cited by examiner

*Primary Examiner* — Joseph Martinez
(74) *Attorney, Agent, or Firm* — Rader, Fishman & Grauer PLLC

(57) ABSTRACT

Disclosed herein is a zoom lens, wherein a stop moves in an optical axis direction n in a phase of zooming; a position of the stop in a telephoto end is located on an object side with respect to a position of the stop in a wide-angle end; an opening size of the stop is controlled in conjunction with the zooming so that an open F number becomes approximately constant in a range from the wide-angle end to a specific intermediate focal length; the opening size of the stop is made approximately constant in a range from the specific intermediate focal length to the telephoto end so that the open F number is changed; and the specific intermediate focal length fulfills the following conditional expression (1), wide-angle end focal length×1.5<specific intermediate focal length<telephoto end focal length/1.4 . . . (1).

7 Claims, 9 Drawing Sheets

ZOOM LENS, LENS BARREL AND IMAGE PICKUP APPARATUS

BACKGROUND OF THE INVENTION

1. Field of the Invention

The present invention relates to a zoom lens, a lens barrel and an image pickup apparatus, and more particularly to a so-called zoom lens as an interchangeable lens of a digital single-lens reflex camera, a lens barrel including the zoom lens, and an image pickup apparatus including the lens barrel.

2. Description of Related Art

For example, a so-called normal zoom lens of a digital single-lens reflex camera is roughly classified into three types of ones, that is, a high-grade type of one, a high-magnification type of one, and a popular type of one. In this case, in the high-grade type of normal zoom lens, in a zoom entire area, brightness is F2.8, and a zoom factor is about 3×. In the high-magnification type of normal zoom lens, brightness in a wide-angle end is about F3.5, and a zoom factor exceeds 10×. Also, in the popular type of normal zoom lens, brightness in a wide-angle end is in the range of F2.8 to F4 and brightness in a telephoto end is in a range of F4 to F5.6, and a zoom factor is in the range of about 4× to about 5×.

In recent years, of the three types of normal zoom lenses, in particular, a penetration rate of the high-magnification type of normal zoom lens has increased. However, a demand for a normal zoom lens which is differentiated from the high-magnification type of normal zoom lens and which has both the high-grade type-like brightness and the popular type-like zoom factor of about 4× to about 5× has increased.

Now, with regard to a construction of a refracting power arrangement of the normal zoom lens, in the case of the normal zoom lens having the brightness of F2.8 in the zoom entire area, a negative lens group preceding type, and a positive lens group preceding type exist. In the negative lens group preceding type, a first lens group is a negative lens group. The negative lens group preceding type zoom lens, for example, is disclosed in Japanese Patent Laid-Open No. 2000-221399. Also, in the positive lens group preceding type, a first lens group is a positive lens group. The positive lens group preceding type is disclosed in Japanese Patent Laid-Open Nos. 2005-181556 and 2007-264381. In each of the high-magnification type of normal zoom lens and the popular type zoom lens, a zoom lens having a four group construction in which a positive lens group, a negative lens group, a positive lens group, and a positive lens group are arranged in order from an object side has become a mainstream.

In addition, any of the negative lens group preceding type of zoom lens, and the positive lens group preceding type of zoom lens is constructed in such a way that a stop moves along with zooming, and thus the stop is located on the object side when the zooming is carried out from a wide-angle end to a telephoto end.

Therefore, when the brightness is desired to be set as being constant, for example, set at F2.8 in the zoom entire area, control needs to be carried out in such a way that an opening size of the stop becomes larger on the telephoto side because a position of an exit pupil moves away from an opening area in a phase of the zooming from the wide-angle end to the telephoto.

SUMMARY OF THE INVENTION

However, when the opening size of the stop becomes large, an outside diameter of a portion for accommodating a stop vane of a stop device becomes large, and a lens barrel for housing the stop vane becomes large, which involves a problem that scaling-up and heavy-weighting are caused.

In addition, not only the stop, but also an effective diameter of a lens arranged on an image side with respect to the stop need to be made large. In particular, an incident quantity of upper side light beam when a light beam is followed up with an image height being set as being positive increases on the wide-angle side, which results in that it is difficult to carry out aberration correction. In this case, it is taken into consideration to weaken the refracting powers of the lens groups for the purpose of carrying out the aberration correction. However, when the refracting powers of the lens groups are weakened, the diameters of the lenses need to be made large, which causes the scaling-up of the zoom lens, the lens barrel, and the image pickup apparatus.

In addition, in the popular type of zoom lens, having the zoom factor of about 5×, disclosed in Japanese Patent Laid-Open No. 2007-264381, the open F number is set at F3.5 in the wide-angle end, and is set at F4.5 in the telephoto end. Therefore, although in an intermediate focal length, the open F number is recognized to change gradually from F3.5 to F4.5, actually, the open F number becomes about F4.5 in the vicinity allowing the zoom factor to exceed 2×, which results in the specification different from that recognized by a user in some cases.

The present embodiment has been made in order to overcome the problems described above, and it is therefore desirable to provide a zoom lens in which a zoom range having a constant open F number, and high magnification promotion are compatible with each other, a lens barrel including the zoom lens, and an image pickup apparatus including the lens barrel.

In order to attain the desire described above, according to an embodiment of the present invention, there is provided a zoom lens, in which a stop moves in an optical axis direction in a phase of zooming; a position of the stop in a telephoto end is located on an object side with respect to a position of the stop in a wide-angle end; an opening size of the stop is controlled in conjunction with the zooming so that an open F number becomes approximately constant in a range from the wide-angle end to a specific intermediate focal length; the opening size of the stop is made approximately constant in a range from the specific intermediate focal length to the telephoto end so that the open F number is changed; and the specific intermediate focal length fulfills the following conditional expression (1):

$$\text{wide-angle end focal length} \times 1.5 < \text{specific intermediate focal length} < \text{telephoto end focal length}/1.4 \quad (1)$$

Therefore, in the zoom lens, the open F number becomes approximately constant in the range from the wide-angle end to the specific intermediate focal length fulfilling the above conditional expression (1). Also, the opening size of the stop is made approximately constant in the range from the specific intermediate focal length to the telephoto end so that the open F number is changed.

In the zoom lens described above, preferably, the opening F number is made brighter than F3 in the range from the wide-angle end to the specific intermediate focal length.

The opening F number is made brighter than F3 in the range from the wide-angle end to the specific intermediate focal length, which results in that the approximately constant brightness is ensured in the range from the wide-angle end to the specific intermediate focal length.

Preferably, the zoom lens described above is composed of a first lens group having a positive refracting power, a second lens group having a negative refracting power, a third lens group, having a positive refracting power, which is moved in the optical axis direction integrally with the stop, and a fourth lens group having a positive refracting power, the first to fourth lens groups being arranged in order from the object side; when the zooming is carried out from the wide-angle side to the telephoto side, an interval between the first lens group and the second lens group increases, an interval between the second lens group and the third lens group narrows, and an interval between the third lens group and the fourth lens group narrows; in a phase of focusing, the second lens group moves in the optical axis direction; and a zoom factor is set at 3.5× or more.

The zoom lens is constructed in the form of the positive lens group preceding type of one in the manner as described above, which results in that it is possible to ensure a high variable power, and it is also possible to reduce a total length in the wide-angle end, and an outside diameter of the lens of the first lens group located closest to the object side.

Moreover, preferably, the second lens group has at least three sheets of concave lenses, and one sheet of convex lens, and at least one surface of the concave lens located closest to the object side, and the convex lens is formed as an aspherical surface.

The at least one surface of the concave lens located closest to the object side of the second lens group, and the convex lens is formed as the aspherical surface, which results in that the aspherical surface can be effectively utilized for the correction for the various kinds of aberrations following the wide-angle promotion in the wide-angle end, and the correction for the various kinds of aberrations increasing resulting from that the open F number of the telephoto end becomes bright.

In addition thereto, in the zoom lens described above, preferably, the first lens group is constructed by arranging a concave lens, a convex lens, and a convex meniscus lens in order from the object side; the second lens group is constructed by arranging a concave meniscus lens having at least one surface formed in a form of an aspherical surface, a concave lens, a cemented lens of a concave lens and a convex lens having a surface, on an image side, formed in a form of an aspherical surface, and a concave meniscus lens having a concave surface directed to the object side in order from the object side; the stop is arranged on the object side of the third lens group; the third lens group is constructed by arranging a double-convex lens, and a cemented lens of a double-convex lens and a concave lens in order from the object side; and the fourth lens group is constructed by arranging a double-convex lens having at least one surface formed in a form of an aspherical surface, a concave meniscus lens having a concave surface directed to the image side, and a cemented lens of a concave lens and a convex lens in order from the object side.

The zoom lens is constructed in the manner as described above, whereby it is possible to ensure the high variable power promotion and the desired open F number, and it is also possible to satisfactorily correct the various kinds of aberrations.

According to another embodiment of the present invention, there is provided a lens barrel including: a zoom lens; and a lens holding barrel having the zoom lens arranged in an inside thereof; in which in the zoom lens, a stop moves in an optical axis direction in a phase of zooming; a position of the stop in a telephoto end is located on an object side with respect to a position of the stop in a wide-angle end; an opening size of the stop is controlled in conjunction with the zooming so that an open F number becomes approximately constant in a range from the wide-angle end to a specific intermediate focal length; the opening size of the stop is made approximately constant in a range from the specific intermediate focal length to the telephoto end so that the open F number is changed; and the specific intermediate focal length fulfills the following conditional expression:

wide-angle end focal length×1.5<specific intermediate focal length<telephoto end focal length/1.4

Therefore, in the lens barrel, the open F number becomes approximately constant in the range from the wide-angle end to the specific intermediate focal length fulfilling the above conditional expression (1). Also, the opening size of the stop is made approximately constant in the range from the specific intermediate focal length to the telephoto end so that the open F number is changed.

According to still another embodiment of the present invention, there is provided an image pickup apparatus including: a lens barrel having a zoom lens and a lens holding barrel having the zoom lens arranged in an inside thereof; an image pickup element for converting an optical image formed by the zoom lens into an electrical signal; and an apparatus main body for holding the lens barrel; in which in the zoom lens, a stop moves in an optical axis direction in a phase of zooming; a position of the stop in a telephoto end is located on an object side with respect to a position of the stop in a wide-angle end; an opening size of the stop is controlled in conjunction with the zooming so that an open F number becomes approximately constant in a range from the wide-angle end to a specific intermediate focal length; the opening size of the stop is made approximately constant in a range from the specific intermediate focal length to the telephoto end so that the open F number is changed; and the specific intermediate focal length fulfills the following conditional expression (1):

wide-angle end focal length×1.5<specific intermediate focal length<telephoto end focal length/1.4 (1)

Therefore, in the image pickup apparatus, the open F number becomes approximately constant in the range from the wide-angle end to the specific intermediate focal length fulfilling the above conditional expression (1). Also, the opening size of the stop is made approximately constant in the range from the specific intermediate focal length to the telephoto end so that the open F number is changed.

In the zoom lens according to the present embodiment, the stop moves in the optical axis direction in the phase of zooming, the position of the stop in the telephoto end is located on the object side with respect to the position of the stop in the wide-angle end, the opening size of the stop is controlled in conjunction with the zooming so that the open F number becomes approximately constant in the range from the wide-angle end to the specific intermediate focal length, the opening size of the stop is made approximately constant in the range from the specific intermediate focal length to the telephoto end so that the open F number is changed, and the specific intermediate focal length fulfills the following conditional expression (1):

wide-angle end focal length×1.5<specific intermediate focal length<telephoto end focal length/1.4 (1)

The lens barrel according to the present embodiment includes the zoom lens, and the lens holding barrel having the zoom lens arranged in the inside thereof, in which in the zoom lens, the stop moves in the optical axis direction in the phase of the zooming, the position of the stop in the telephoto end is located on the object side with respect to the position of the stop in the wide-angle end, the opening size of the stop is controlled in conjunction with the zooming so that the open F number becomes approximately constant in the range from the wide-angle end to the specific intermediate focal length, the opening size of the stop is made approximately constant in the range from the specific intermediate focal length to the telephoto end so that the open F number is changed, and the specific intermediate focal length fulfills the following conditional expression (1):

$$\text{wide-angle end focal length} \times 1.5 < \text{specific intermediate focal length} < \text{telephoto end focal length}/1.4 \quad (1)$$

The image pickup apparatus according to the present embodiment includes the lens barrel having the zoom lens and the lens holding barrel having the zoom lens arranged in the inside thereof, the image pickup element for converting the optical image formed by the zoom lens into the electrical signal, and the apparatus main body for holding the lens barrel, in which in the zoom lens, the stop moves in the optical axis direction in the phase of the zooming, the position of the stop in the telephoto end is located on the object side with respect to the position of the stop in the wide-angle end, the opening size of the stop is controlled in conjunction with the zooming so that the open F number becomes approximately constant in the range from the wide-angle end to the specific intermediate focal length, the opening size of the stop is made approximately constant in the range from the specific intermediate focal length to the telephoto end so that the open F number is changed, and the specific intermediate focal length fulfills the following conditional expression (1):

$$\text{wide-angle end focal length} \times 1.5 < \text{specific intermediate focal length} < \text{telephoto end focal length}/1.4 \quad (1)$$

Accordingly, in the zoom lens, the lens barrel including the zoom lens, and the image pickup apparatus including the lens barrel, the zoom area having the constant bright open F number, and the high magnification promotion can be made compatible with each other.

DETAILED DESCRIPTION OF THE PREFERRED EMBODIMENTS

Preferred embodiments of a zoom lens, a lens barrel including the zoom lens, and an image pickup apparatus including the lens barrel according to the present embodiment will be described in detail hereinafter with reference to the accompanying drawings.

Firstly, an embodiment mode of the zoom lens according to the present embodiment will be described below.

The zoom lens of the embodiment mode is constructed as follows. That is to say, a stop moves in an optical axis direction in a phase of zooming, a position of the stop in a telephoto end is located on an object side with respect to a position of the stop in a wide-angle end, an opening size of the stop is controlled in conjunction with the zooming so that an open F number becomes approximately constant in a range from the wide-angle end to a specific intermediate focal length, the opening size of the stop is made approximately constant in a range from the specific intermediate focal length to the telephoto end so that the open F number is changed, and the specific intermediate focal length fulfills the following conditional expression (1):

$$\text{wide-angle end focal length} \times 1.5 < \text{specific intermediate focal length} < \text{telephoto end focal length}/1.4 \quad (1)$$

In the zoom lens, the opening size of the stop is preferably controlled in conjunction with the zooming so that in the range from the wide-angle end to the specific intermediate focal length, the open F number, for example, becomes approximately constant so as to fall within the range of ±10%.

In addition, in the zoom lens, in the range from the specific intermediate focal length to the telephoto end, the opening size of the stop, for example, is made approximately constant so as to fall within the range of ±10% so that the open F number is changed.

With regard to the above conditional expression (1), in accordance with the specific intermediate focal length, the control for the opening size of the stop is switched from a state in which the open F number is approximately constant over to a state in which a maximum diameter is approximately constant. When a lower limit in the conditional expression (1) is exceeded, the specification becomes a specification which is rarely different from one of the existing popular type of normal zoom lens. On the other hand, when an upper limit in the conditional expression (1) is exceeded, the opening size of the stop in the telephoto end becomes too large, which causes the scaling-up and the difficulty of the aberration correction.

As has been described above, in the zoom lens, the opening size of the stop is changed in conjunction with the zooming so that in the given region on the wide-angle side, the open F number becomes approximately constant. As a result, it is possible to fulfill the so-called high-grade type of specification in which the given bright open F number and the predetermined zoom factor are both ensured.

In addition, on the telephoto side on which an increase in opening size of the stop causes the increasing in size of the lens barrel, the opening size of the stop is made approximately constant, thereby making it possible to avoid the increasing in size of the lens barrel. In addition thereto, no bright open F number is demanded for the telephoto end, whereby the effective diameter of the lens is prevented from becoming larger on the image side with respect to the stop. Thus, the light quantity is prevented from being unnecessarily made incident on the wide-angle side too much, and thus the satisfactory aberration correction can be carried out.

Therefore, in the zoom lens, the zoom area having the constant bright open F number, and the high magnification promotion can be made compatible with each other.

In the zoom lens, preferably, the opening F number is made brighter than F3 in the range from the wide-angle end to the specific intermediate focal length.

The opening F number is made brighter than F3 in the range from the wide-angle end to the specific intermediate focal length, whereby the same specification as that of the existing high-grade type of zoom lens can be obtained on the wide-angle side. That is to say, if the open F number is darker than F3, even when the open F number is made approximately constant up to the telephoto end, it is possible to ensure the outside diameter of the lens barrel which is rarely different from the existing popular type of zoom lens. In this case, however, it may be impossible to attain the fusion between the high-grade type of zoom lens and the popular type of zoom lens as the desire of the present embodiment.

In addition, preferably, the zoom lens described above is composed of a first lens group having a positive refracting power, a second lens group having a negative refracting power, a third lens group, having a positive refracting power, which is moved in the optical axis direction integrally with the stop, and a fourth lens group having a positive refracting power, the first to fourth lens groups being arranged in order from the object side. In this case, preferably, when the zooming is carried out from the wide-angle side to the telephoto side, an interval between the first lens group and the second lens group increases, an interval between the second lens group and the third lens group narrows, and an interval between the third lens group and the fourth lens group narrows. Also, in a phase of focusing, the second lens group moves in the optical axis direction, and a zoom factor is set at 3.5× or more.

The zoom lens is constructed in the form of a positive lens preceding type of one, which results in that even when the field angle in the wide-angle end is set at 70° or more, and the zoom factor is set at 3.5× or more, the total length in the wide-angle end, and the outside diameter of the front lens (the lens of the first lens group located closest to the object side) can be made relatively small. As a result, it is possible to obtain the optical refracting power arrangement for attaining the desire of the present embodiment.

In the zoom lens, preferably, the second lens group has at least three sheets of concave lenses, and one sheet of convex lens, and at least one surface of the concave lens located closest to the object side, and the convex lens is formed in the form of an aspherical surface.

The zoom lens is constructed in the manner as described above, which results in that the aspherical surface can be effectively utilized for the correction for the various kinds of aberrations following the wide-angle promotion in the wide-angle end, and the correction for the various kinds of aberrations increasing resulting from that the open F number of the telephoto end becomes bright. In addition, the aspherical surface is formed in the concave lens of the second lens group located closest to the object side, which results in that it is possible to effectively correct the change in curvature of field following the distortion aberration and the focusing in the wide-angle end. Moreover, the aspherical surface is formed in the convex lens of the second lens group, which results in that it is possible to effectively correct a coma aberration following the focusing in the telephoto end.

In addition thereto, the zoom lens is preferably constructed in the following manner. That is to say, the first lens group is constructed by arranging a concave lens, a convex lens, and a convex meniscus lens in order from the object side. The second lens group is constructed by arranging a concave meniscus lens having at least one surface formed in a form of an aspherical surface, a concave lens, a cemented lens of a concave lens and a convex lens having a surface, on an image side, formed in a form of an aspherical surface, and a concave meniscus lens having a concave surface directed to the object side in order from the object side. The stop is arranged on the object side of the third lens group, and the third lens group is constructed by arranging a double-convex lens, and a cemented lens of a double-convex lens and a concave lens in order from the object side. Also, the fourth lens group is constructed by arranging a double-convex lens having at least one surface formed in a form of an aspherical surface, a concave meniscus lens having a concave surface directed to the image side, and a cemented lens of a concave lens and a convex lens in order from the object side.

The zoom lens is constructed in the manner as described above, which results in that it is possible to fulfill the specification that the open F number is constant, i.e., about F2.8 in the range in which the field angle in the wide-angle end is 80° or more, the zoom factor is about 5×, and the zoom factor from the wide-angle end is about 3×, and it is possible to satisfactorily correct the various kinds of aberrations.

Next, an embodiment of the zoom lens according to the present invention, a numerical example thereof will be described in detail with reference to FIGS. 1 to 4 and TABLES 1 to 3.

It is noted that the meanings and the like of reference symbols shown in the following description are stated as follows.

"A surface number i" is a number of an i-th surface from the object side, "a curvature radius r" is a curvature radius of an i-th surface (i-th surface) for the image side from the object side, and "a surface interval d" is a surface interval on an axis between the i-th surface and an (i+1)-th surface. Also, "a refractive index nd" is a refractive index of a material composing the lens in a d line (with a wavelength of 587.6 nm), and "an Abbe's number νd" is an Abbe's number of a material composing the lens in the d line. Also, with regard to the surface number, "ASP" represents that the surface concerned is formed as an aspherical surface, with regard to the curvature radius, "∞" represents that the surface concerned is a planar surface, and with regard to the surface interval, "variable" represents that the surface concerned shows a variable interval.

An aspherical surface shape is defined by $$x_i = H^2/r_i \{1 + (1 - H^2/r_i^2)^{1/2}\} + \Sigma A_k H^k \quad (2)$$

where $x_i$ is a depth of the aspherical surface, H is a height from an optical axis, $r_i$ is a curvature radius, $A_k$ is an aspherical surface coefficient, and k is an order.

Figure 1A:
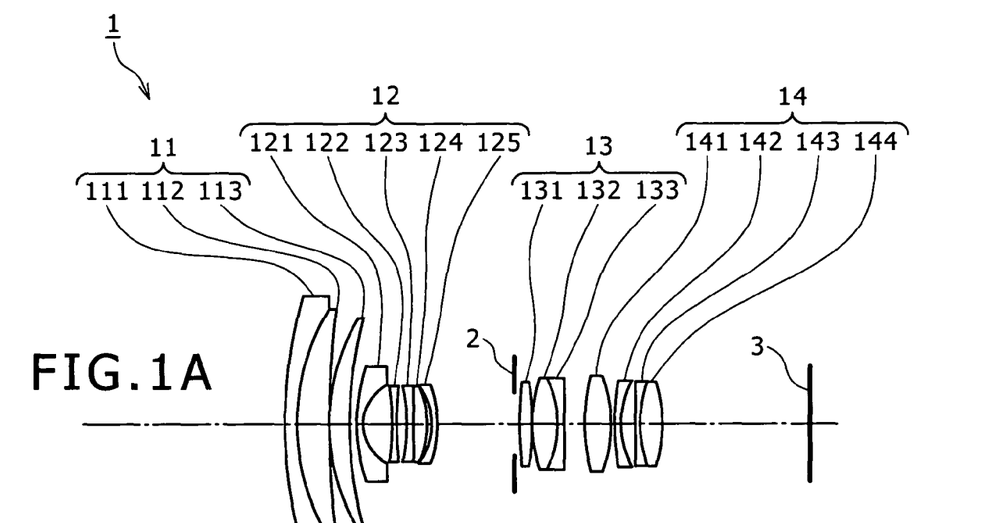
FIGS. 1A to 1C are respectively views each showing a lens arrangement of a zoom lens according to an embodiment of the present invention.
Figure 1B:
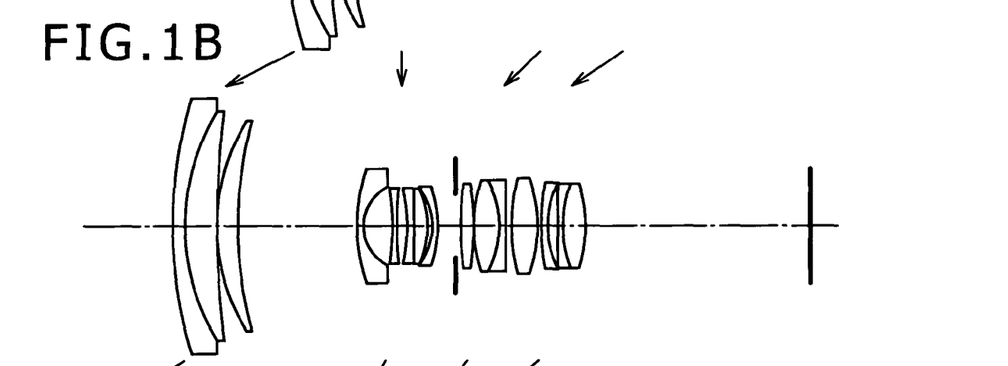
Figure 1C:
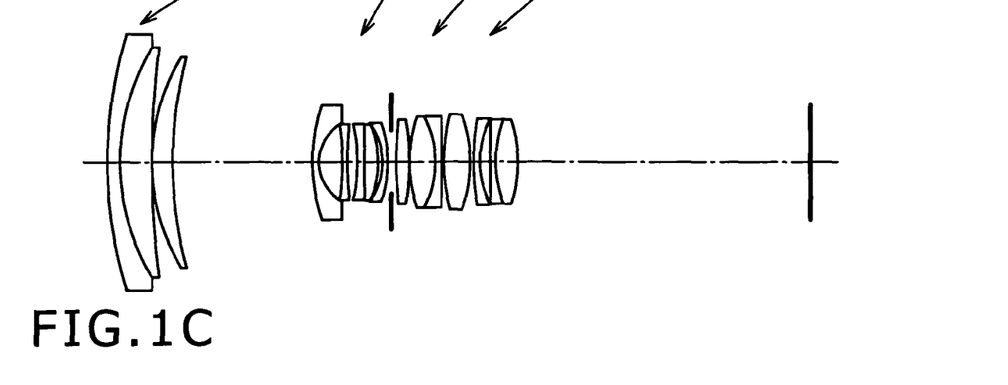

FIGS. 1A to 1C are respectively views each showing a lens construction of a zoom lens 1 according to an embodiment of the present invention. As apparent from these figures, the zoom lens 1 has fifteen sheets of lenses.

Here, FIG. 1A shows a wide-angle end state, FIG. 1B shows a specific intermediate focal length state, and FIG. 1C shows a telephoto end state.

The zoom lens 1 is constructed by arranging a first lens group 11 having a positive refracting power, a second lens group 12 having a negative refracting power, a third lens group 13 having a positive refracting power, and a fourth lens group 14 having a positive refracting power in order from an object side. In this case, the third lens group 13 is moved in an optical axis direction integrally with a stop 2. Also, an imaging surface 3 functioning as an imaging section is arranged on the image side of the fourth lens group 14.

In the zoom lens 1, when the zooming is carried out from the wide-angle side to the telephoto side, an interval between the first lens group 11 and the second lens group 12 increases, an interval between the second lens group 12 and the third lens group 13 narrows, and an interval between the third lens group 13 and the fourth lens group 14 narrows. In addition, when the focusing is carried out, the second lens group 12 is moved in the optical axis direction.

In the zoom lens 1, an opening size of the stop 2 changes so that the open F number becomes constant, i.e., F2.8 in the range in which the zoom factor is about 5×, and the zoom factor ranges up to about 3× from the wide-angle end. Also, the opening size of the stop is made approximately constant in the range in which the zoom factor ranges from about 3× up to the telephoto end side, and thus the open F number is set at about F3.5 in the telephoto end.

The first lens group 11 is constituted by arranging a concave lens 111, a convex lens 112 and a convex meniscus lens 113 in order from the object side.

The second lens group 12 is constructed by arranging a concave meniscus lens 121, a concave lens 122, a cemented lens, and a concave meniscus lens 125 in order from the object side. In this case, the concave meniscus lens 121 has a compound asphereical surface formed on a surface thereof on the object side. The cemented lens is constructed by cementing a concave lens 123 and a convex lens 124 having a surface on the image side formed as an aspherical surface. Also, the convex meniscus lens 125 has a concave surface directed to the object side.

The third lens group 13 is constructed by arranging a double-convex lens 131, and a cemented lens constructed by cementing a double-convex lens 132 and a concave lens 133 in order from the object side.

The fourth lens group 14 is constructed by arranging a double-convex lens 141, a concave meniscus lens 142 and a cemented lens in order from the object side. In this case, the double-convex lens 141 has both surfaces each formed as an aspherical surface. The concave meniscus lens 142 has a concave surface directed to the image side. Also, the cemented lens is constructed by cementing a concave lens 143 and a convex lens 144.

The stop 2 which is moved in the optical axis direction integrally with the third lens group 13 is arranged on the object side of the third lens group 13.

TABLE 1 shows lens data in a numerical example of the embodiment of the zoom lens 1.

TABLE 1

| optical element | surface number i | curvature radius r | surface interval d | refractive index nd | Abbe's number vd |
|---|---|---|---|---|---|
| 111 | 1 | 124.181 | 3.000 | 1.92286 | 20.9 |
| 112 | 2 | 58.560 | 7.320 | 1.77250 | 49.6 |
|  | 3 | 222.222 | 0.150 |  |  |
| 113 | 4 | 48.082 | 6.000 | 1.83481 | 42.7 |
|  | 5 | 106.855 | variable |  |  |
| 121 | 6' (ASP) | 45.872 | 0.080 | 1.53610 | 41.2 |
| 121 | 6 | 43.234 | 0.850 | 1.72916 | 54.7 |
|  | 7 | 11.209 | 7.126 |  |  |
| 122 | 8 | −93.063 | 0.850 | 1.72916 | 54.7 |
|  | 9 | 75.361 | 2.377 |  |  |
| 123 | 10 | −62.191 | 0.850 | 1.88300 | 40.8 |
| 124 | 11 | 62.191 | 4.306 | 1.82114 | 24.1 |
|  | 12 (ASP) | −29.119 | 1.043 |  |  |
| 125 | 13 | −16.529 | 0.850 | 1.77250 | 49.6 |
|  | 14 | −28.286 | variable |  |  |
| stop 2 | 15 | ∞ | 0.900 |  |  |
| 131 | 16 | 71.058 | 3.122 | 1.58144 | 40.9 |
|  | 17 | −71.058 | 0.150 |  |  |

TABLE 1-continued

| optical element | surface number i | curvature radius r | surface interval d | refractive index nd | Abbe's number vd |
|---|---|---|---|---|---|
| 132 | 18 | 33.024 | 6.625 | 1.48749 | 70.4 |
| 133 | 19 | −24.232 | 1.000 | 1.88300 | 40.8 |
|  | 20 | 1148.600 | variable |  |  |
| 141 | 21 (ASP) | 32.906 | 5.698 | 1.58313 | 59.5 |
|  | 22 (ASP) | −32.906 | 1.205 |  |  |
| 142 | 23 | 71.615 | 0.850 | 1.88300 | 40.8 |
|  | 24 | 28.731 | 3.232 |  |  |
| 143 | 25 | 116.000 | 0.850 | 1.90366 | 31.3 |
| 144 | 26 | 28.023 | 6.312 | 1.51680 | 64.2 |
|  | 27 | −28.023 | variable |  |  |
| imaging area 3 | 28 | ∞ |  |  |  |

In the zoom lens 1, the surface (surface number 6') of the concave meniscus lens 121 of the second lens group 12 on the object side, the surface (surface number 12) of the convex lens 124 of the second lens group 12 on the image side, the surface (surface number 21) of the double-convex lens 141 of the fourth lens group 14 on the object side, and the surface (surface number 22) of the double-convex lens 141 of the fourth lens group 14 on the image side are formed in the form of the aspherical surfaces, respectively.

TABLE 2 shows a four order aspherical surface coefficient A4, a six order aspherical surface coefficient A6, . . . of the aspherical surface in the numerical example.

It is noted that in TABLE 2, "E-i" is exponential expression with 10 as a base, that is, expresses "$10^{-i}$." For example, "0.12345E−05" represents "$0.12345 \times 10^{-5}$."

TABLE 2

| | surface number | | | |
|---|---|---|---|---|
| | 6' | 12 | 21 | 22 |
| A4 | +0.70892e−05 | −0.20260e−04 | −0.14937e−04 | +0.14937e−04 |
| A6 | −0.74947e−07 | −0.54576e−07 | +0.19041e−07 | −0.19041e−07 |
| A8 | +0.10798e−08 | −0.48087e−09 | −0.23780e−10 | +0.23780e−10 |
| A10 | −0.11224e−10 | −0.14600e−11 | | |
| A12 | +0.65354e−13 | | | |
| A14 | −0.20000e−15 | | | |
| A16 | +0.25358e−18 | | | |

TABLE 3 shows the variable intervals when the lens position state changes together with the open F number, the opening size of the stop, and the field angle 2ω in the wide-angle end state (the focal length f=16.492), the specific intermediate focal length state (the focal length f=48.814), and the telephoto end state (the focal length f=77.958) in the numerical example.

TABLE 3

| focal length | 16.492 | 48.814 | 77.968 |
|---|---|---|---|
| F number | 2.85 | 2.94 | 3.59 |
| opening size of stop | 15.274 | 19.702 | 19.656 |
| 2ω (°) | 83.54 | 32.30 | 20.50 |
| d5 | 1.740 | 28.004 | 33.036 |
| d14 | 19.485 | 6.079 | 1.000 |
| d20 | 6.070 | 1.402 | 0.600 |
| d27 | 37.034 | 55.441 | 72.072 |

Figure 2:
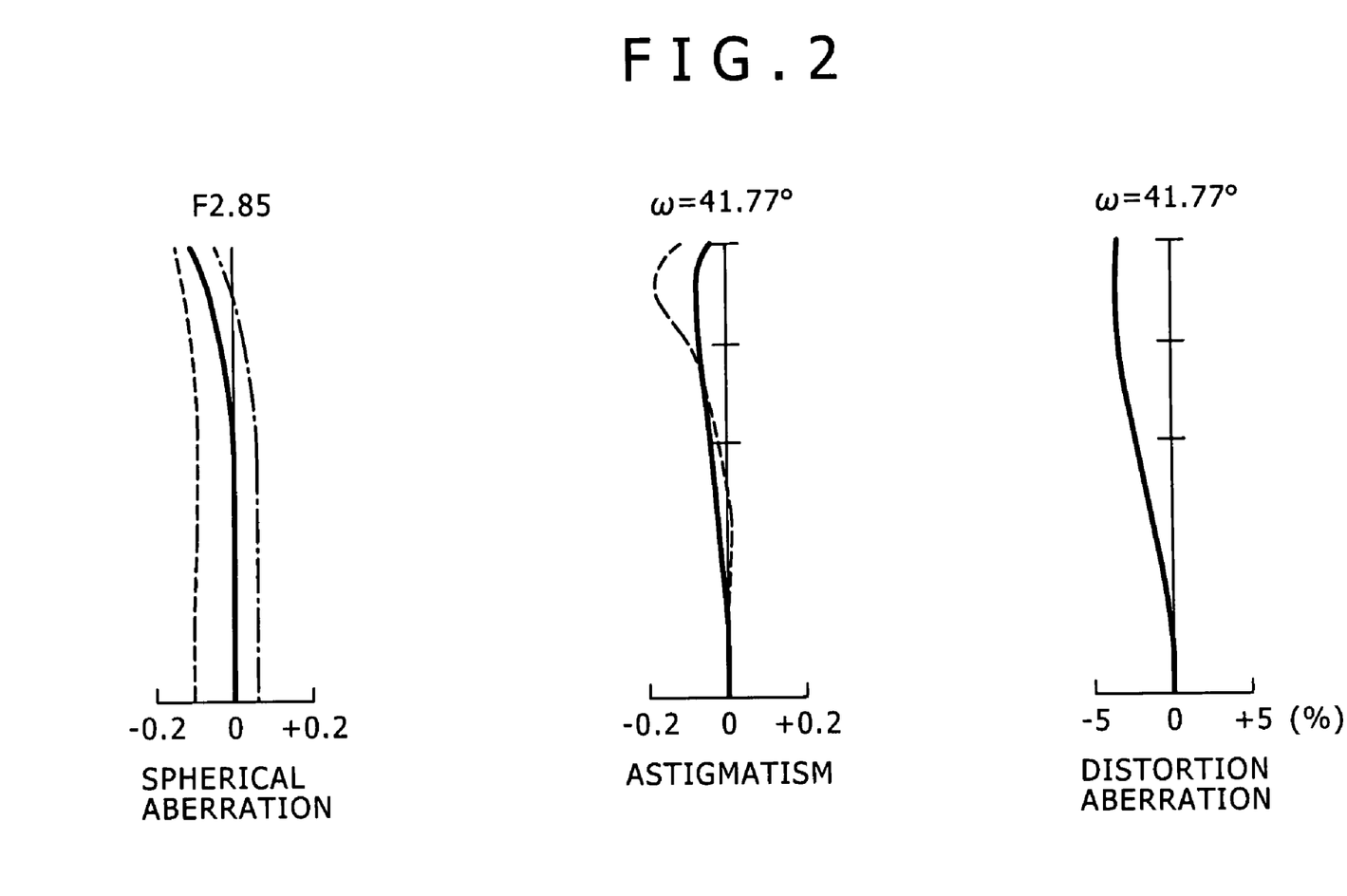
FIG. 2 is aberration diagrams showing a spherical aberration, an astigmatism, and a distortion aberration in a wide-angle end state in a numerical example of the embodiment of the zoom lens shown in FIGS. 1A to 1C.
Figure 3:
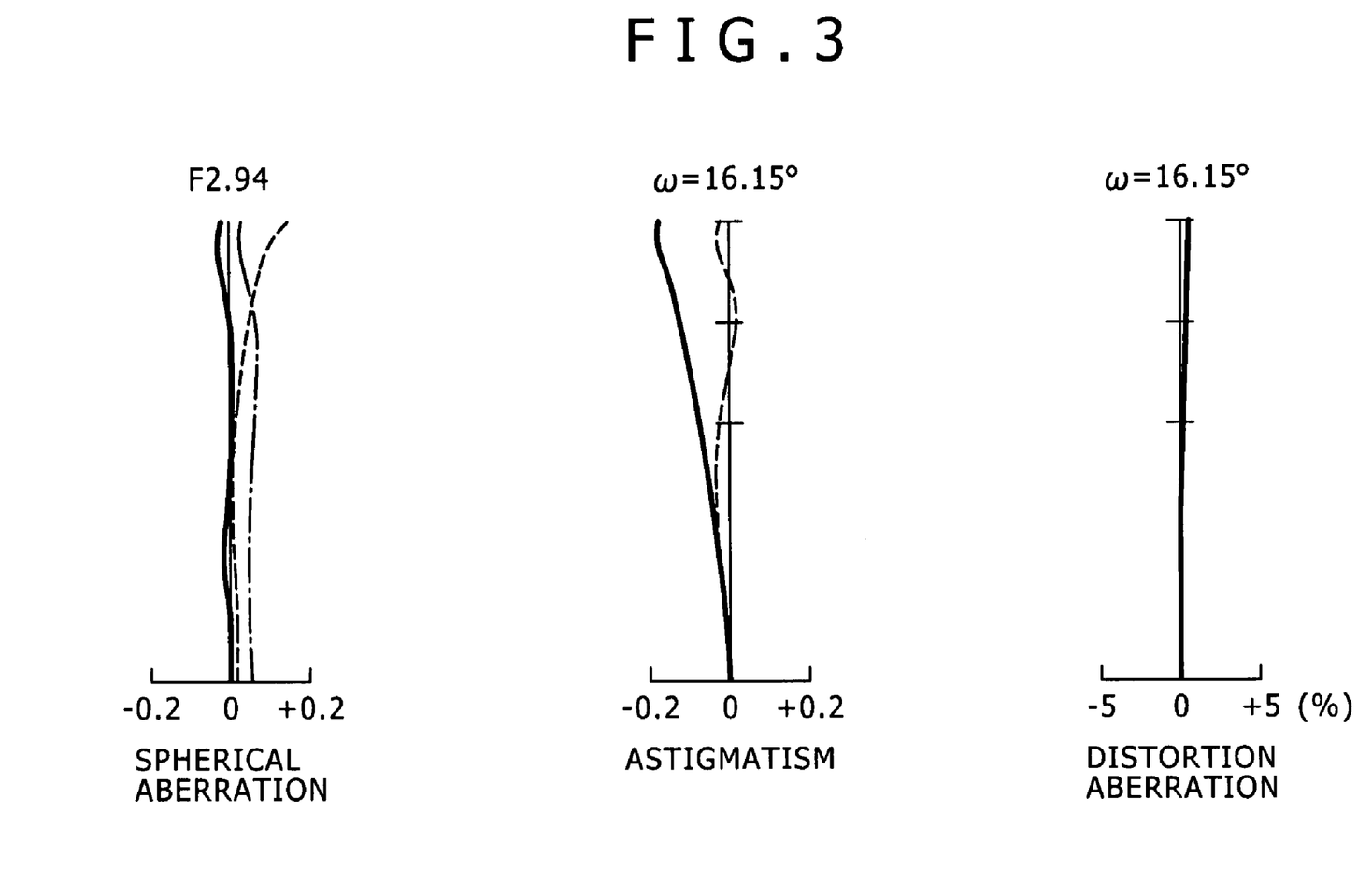
FIG. 3 is aberration diagrams showing the spherical aberration, the astigmatism, and the distortion aberration in a specific intermediate focal length state in the numerical example of the embodiment of the zoom lens shown in FIGS. 1A to 1C.
Figure 4:
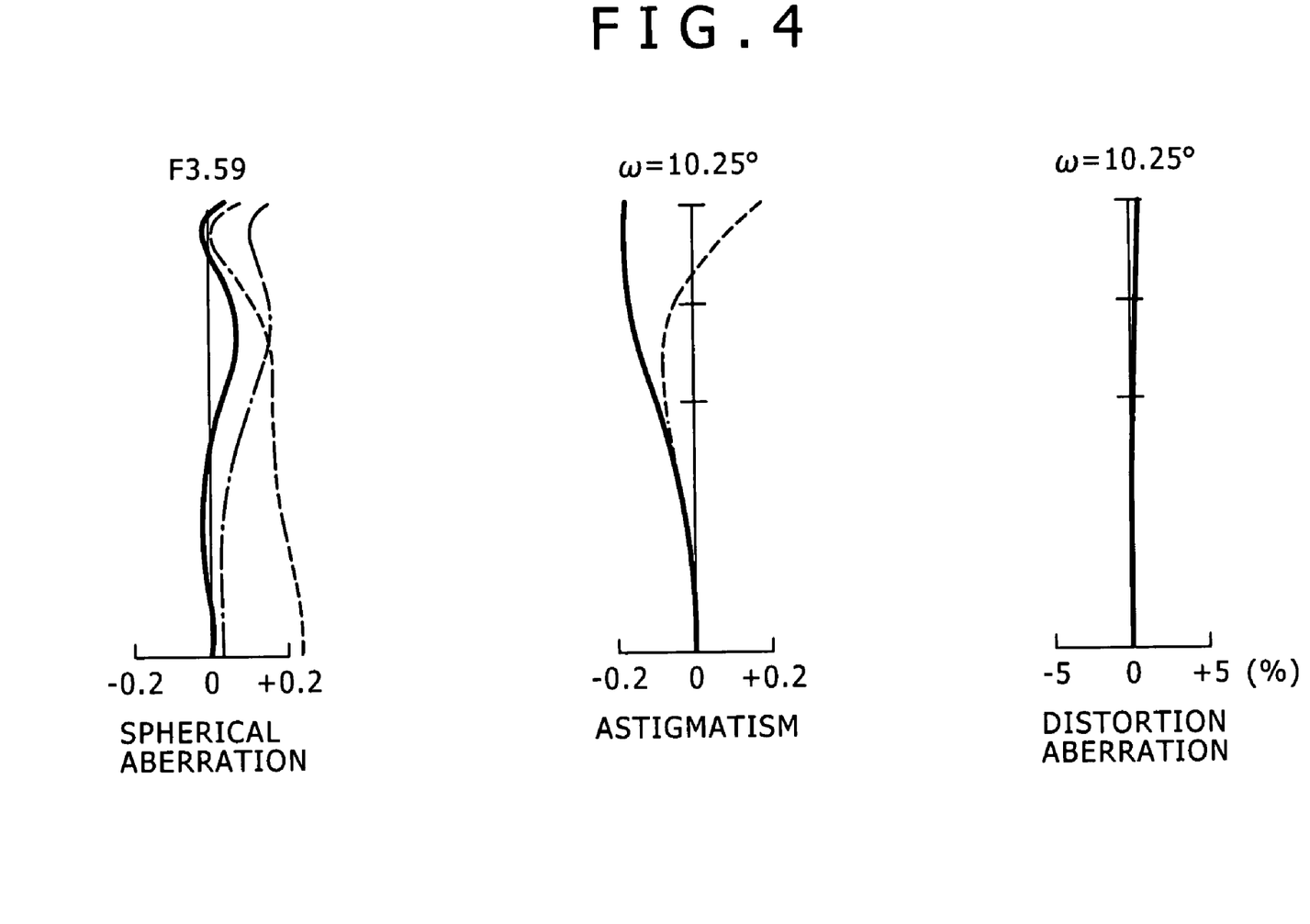
FIG. 4 is aberration diagrams showing the spherical aberration, the astigmatism, and the distortion aberration in a telephoto end state in the numerical example of the embodiment of the zoom lens shown in FIGS. 1A to 1C.

FIGS. 2 to 4 respectively various aberration diagrams in an infinite focusing state in the numerical example. FIG. 2 is the various aberration diagrams in the wide-angle end state (the focal length f=16.492), FIG. 3 is the various aberration diagrams in the specific intermediate focal length state (the focal length f=48.814), and FIG. 4 is the various aberration diagrams in the telephoto end state (the focal length f=77.968).

In the various aberration diagrams shown in FIGS. 2 to 4, in the spherical aberration curve, a solid line represents values of a d line (with a wavelength of 587.6 nm), a broken line represents values of a g line (with a wavelength of 435.8 nm), and a dashed line represents values of a c line (with a wavelength of 656.3 nm). Also, in the astigmatism curve, a solid line represents values in a sagittal image surface, and a broken line represents values in a meridional image surface.

From the aberration diagrams shown in FIGS. 2 to 4, it is obvious that in the numerical example, the various aberrations are satisfactorily corrected, and the zoom lens 1 has the superior imaging performance.

As has been described, in the numerical example, the wide-angle end focal length is 16.492, the specific intermediate focal length is 48.814, and the telephoto end focal length is 77.968.

Therefore, the zoom lens of the numerical example is constructed so that the specific intermediate focal length fulfills the following inequality expression obtained by substituting the above values into the conditional expression (1) described above:

$$16.492 \times 1.5 < 48.814 < 77.968/1.4$$

Note that, the embodiment and numerical example thereof described above are merely an example for attaining the desire of the present embodiment. That is to say, the lens elements composing the cemented lens in each of the second to fourth lens groups 12 to 14 may be arranged separately from each other. Conversely, the lens elements which are arranged separately from one another may be constructed in the form of the cemented lens.

Next, an embodiment mode of the lens barrel according to the present invention will be described below.

The lens barrel of the embodiment mode includes the zoom lens and a lens holding barrel having the zoom lens arranged in the inside thereof.

The zoom lens in the lens barrel of the embodiment mode is constructed as follows. That is to say, the stop moves in the optical axis direction in the phase of the zooming, the position of the stop in the telephoto end is located on the object side with respect to the position of the stop in the wide-angle end, the opening size of the stop is controlled in conjunction with the zooming so that the open F number becomes approximately constant in the range from the wide-angle end to the specific intermediate focal length, the opening size of the stop is made approximately constant in the range from the specific intermediate focal length to the telephoto end so that the open F number is changed, and the specific intermediate focal length fulfills the following conditional expression (1):

$$\text{wide-angle end focal length} \times 1.5 < \text{specific intermediate focal length} < \text{telephoto end focal length}/1.4 \quad (1)$$

In the lens barrel, preferably, the opening size of the stop is preferably controlled in conjunction with the zooming so that in the range from the wide-angle end to the specific intermediate focal length, the open F number, for example, becomes approximately constant so as to fall within the range of ±10%.

In addition, in the lens barrel, preferably, in the range from the specific intermediate focal length to the telephoto end, the opening size of the stop, for example, is made approximately constant so as to fall within the range of ±10% so that the open F number is changed.

With regard to the above conditional expression (1), in accordance with the specific intermediate focal length, the control for the opening size of the stop is switched from the state in which the open F number is approximately constant over to the state in which the maximum diameter is approximately constant. When the lower limit is exceeded, the specification becomes the specification which is rarely different from one of the existing popular type of normal zoom lens. On the other hand, when the upper limit is exceeded, the opening size of the stop in the telephoto end becomes too large, which causes the scaling-up and the difficulty of the aberration correction.

As has been described above, in the lens barrel, the opening size of the stop is changed in conjunction with the zooming so that in the given region on the wide-angle side, the open F number becomes approximately constant. As a result, it is possible to fulfill the so-called high-grade type of specification in which the given bright open F number and the predetermined zoom factor are both ensured.

In addition, on the telephoto side on which the increase in opening size of the stop causes the increasing in size of the lens barrel, the opening size of the stop is made approximately constant, thereby making it possible to avoid the increasing in size of the lens barrel. In addition thereto, no bright open F number is demanded for the telephoto end, whereby the effective diameter of the lens is prevented from becoming larger on the image side with respect to the stop. Thus, the light quantity is prevented from being unnecessarily made incident on the wide-angle side too much, and thus the satisfactory aberration correction can be carried out.

Therefore, in the lens barrel, the zoom area having the constant bright open F number, and the high magnification promotion can be made compatible with each other.

Next, an embodiment of the lens barrel according to the present embodiment will be described below.

The lens barrel 22 (refer to FIG. 5) includes the zoom lens 1 and a lens holding barrel 23 (refer to FIG. 5) having the zoom lens 1 arranged in the inside thereof. The zoom lens 1 shown in FIG. 1 is incorporated in the lens barrel 22 in such a manner and the construction thereof is as described with reference to FIG. 1. In addition, the lens holding barrel 23 is incorporated in the image pickup apparatus 20 (refer to FIG. 5) and the construction thereof is as will be described in an embodiment of the image pickup apparatus 20 later.

Next, an embodiment mode of the image pickup apparatus according to the present invention will be described below.

The image pickup apparatus of the embodiment mode includes the lens barrel having the zoom lens and the lens holding barrel having the zoom lens arranged in the inside thereof, an image pickup element for converting an optical image formed by the zoom lens into an electrical signal, and an apparatus main body for holding the lens barrel.

The zoom lens in the image pickup apparatus of the embodiment mode is constructed as follows. That is to say, the stop moves in the optical axis direction in the phase of the zooming, the position of the stop in the telephoto end is located on the object side with respect to the position of the stop in the wide-angle end, the opening size of the stop is controlled in conjunction with the zooming so that the open F number becomes approximately constant in the range from the wide-angle end to the specific intermediate focal length, the opening size of the stop is made approximately constant in the range from the telephoto end to the specific intermediate focal length so that the open F number is changed, and the specific intermediate focal length fulfills the following conditional expression (1):

$$\text{wide-angle end focal length} \times 1.5 < \text{specific intermediate focal length} < \text{telephoto end focal length}/1.4 \quad (1)$$

In the image pickup apparatus, preferably, the opening size of the stop is preferably controlled in conjunction with the zooming so that in the range from the wide-angle end to the specific intermediate focal length, the open F number, for example, becomes approximately constant so as to fall within the range of ±10%.

In addition, in the image pickup apparatus, preferably, in the range from the specific intermediate focal length to the telephoto end, the opening size of the stop, for example, is made approximately constant so as to fall within the range of ±10% so that the open F number is changed.

With regard to the above conditional expression (1), in accordance with the specific intermediate focal length, the control for the opening size of the stop is switched from the state in which the open F number is approximately constant over to the state in which the maximum diameter is approximately constant. When the lower limit is exceeded, the specification becomes the specification which is rarely different from one of the existing popular type of normal zoom lens. On the other hand, when the upper limit is exceeded, the opening size of the stop in the telephoto end becomes too large, which causes the scaling-up and the difficulty of the aberration correction.

As has been described above, in the image pickup apparatus, the opening size of the stop is changed in conjunction with the zooming so that in the given region on the wide-angle side, the open F number becomes approximately constant. As a result, it is possible to fulfill the so-called high-grade type of specification in which the given bright open F number and the predetermined zoom factor are both ensured.

In addition, on the telephoto side on which an increase in opening size of the stop causes the increasing in size of the lens barrel, the opening size of the stop is made approximately constant, thereby making it possible to avoid the increasing in size of the lens barrel. In addition thereto, no bright open F number is demanded for the telephoto end, whereby the effective diameter of the lens is prevented from becoming larger on the image side with respect to the stop. Thus, the light quantity is prevented from being unnecessarily made incident on the wide-angle side too much, and thus the satisfactory aberration correction can be carried out.

Therefore, in the lens barrel, the zoom area having the constant bright open F number, and the high magnification promotion can be made compatible with each other.

Hereinafter, an embodiment of an image pickup apparatus according to the present invention will be described in detail.

Firstly, constructions of constituent elements of the embodiment of the image pickup apparatus according to the present invention will be described with reference to FIGS. 5 to 9. In this embodiment, the image pickup apparatus is applied to a digital still camera.

Figure 5:
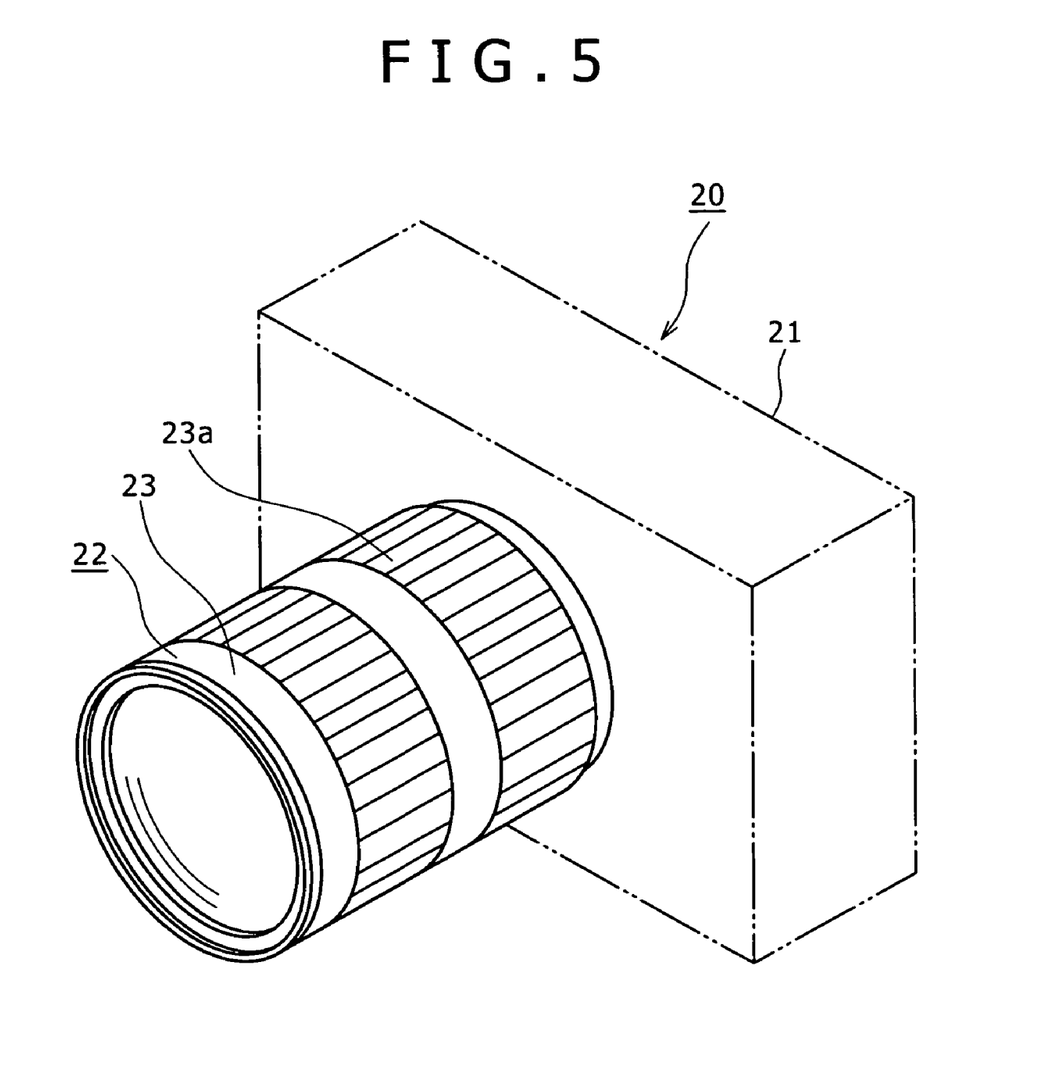
FIG. 5 is a schematic perspective view of an image pickup apparatus according to an embodiment of the present invention.

As shown in FIG. 5, the image pickup apparatus 20 includes an apparatus main body 21, and the lens barrel 22 held in the apparatus main body 21.

The lens barrel 22 is an interchangeable lens which is detachably attached to the apparatus main body 21. However, the lens barrel 22 is by no means limited to the interchangeable lens, and thus a lens portion may also be adopted which is previously incorporated in the apparatus main body 21 or is provided integrally with the apparatus main body 21.

The apparatus main body 21 has a control circuit (not shown) in the inside thereof. The control circuit, for example, executes various kinds of processing such as signal processing, recording/reproducing processing, display processing, writing/reading processing, and control processing. In this case, in the signal processing, analog-to-digital conversion for an image signal obtained through image capturing, and the like are carried out, in the recording/reproducing processing, the image signal is recorded/reproduced, and in the display processing, an image or the like is displayed based on the image signal. Also, in the writing/reading processing, the image signal is written/read out, and in the control processing, the drive for the zoom lens 1 provided in the lens barrel 22 is controlled.

In the image pickup apparatus 20, a Charge Coupled Device (CCD), a Complementary Metal Oxide Semiconductor (CMOS) device or the like is used as the image pickup element having the imaging area 3.

The lens barrel 22 has a lens holding barrel 23, and the above-mentioned zoom lens 1 arranged inside the lens holding barrel 23. The lens holding barrel 23 is provided with a zoom ring 23a which is rotation-manipulated for the zooming by the user.

Figure 6:
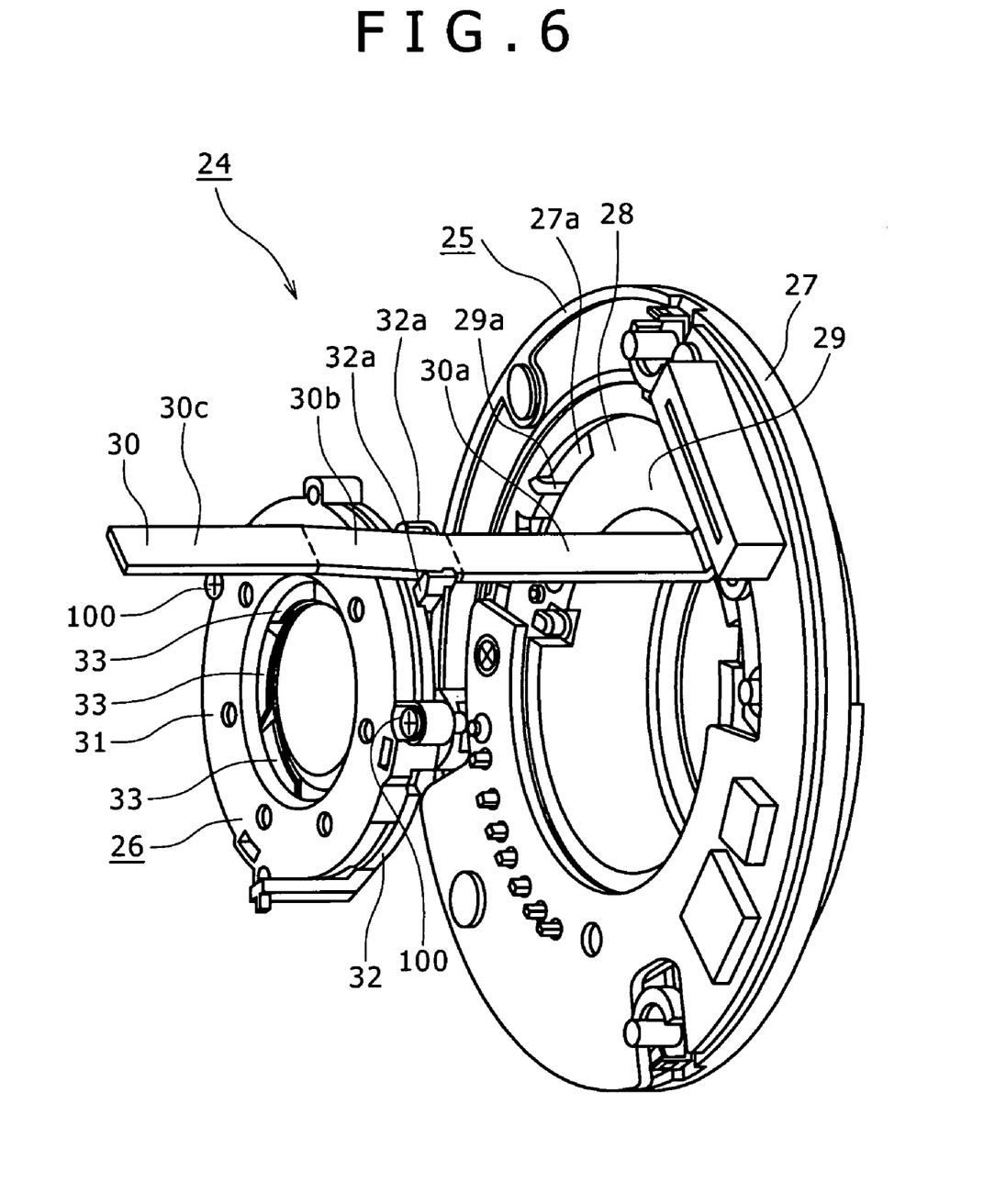
FIG. 6 is a perspective view showing a construction of a stop control mechanism of the image pickup apparatus of the embodiment shown in FIG. 5.

A stop control mechanism 24 for controlling the opening size of the stop 2 in conjunction with the zooming of the zooming lens 1 is provided inside the lens barrel 22 (refer to FIG. 6).

The stop control mechanism 24 includes a mount unit 25 and a stop unit 26.

Figure 7:
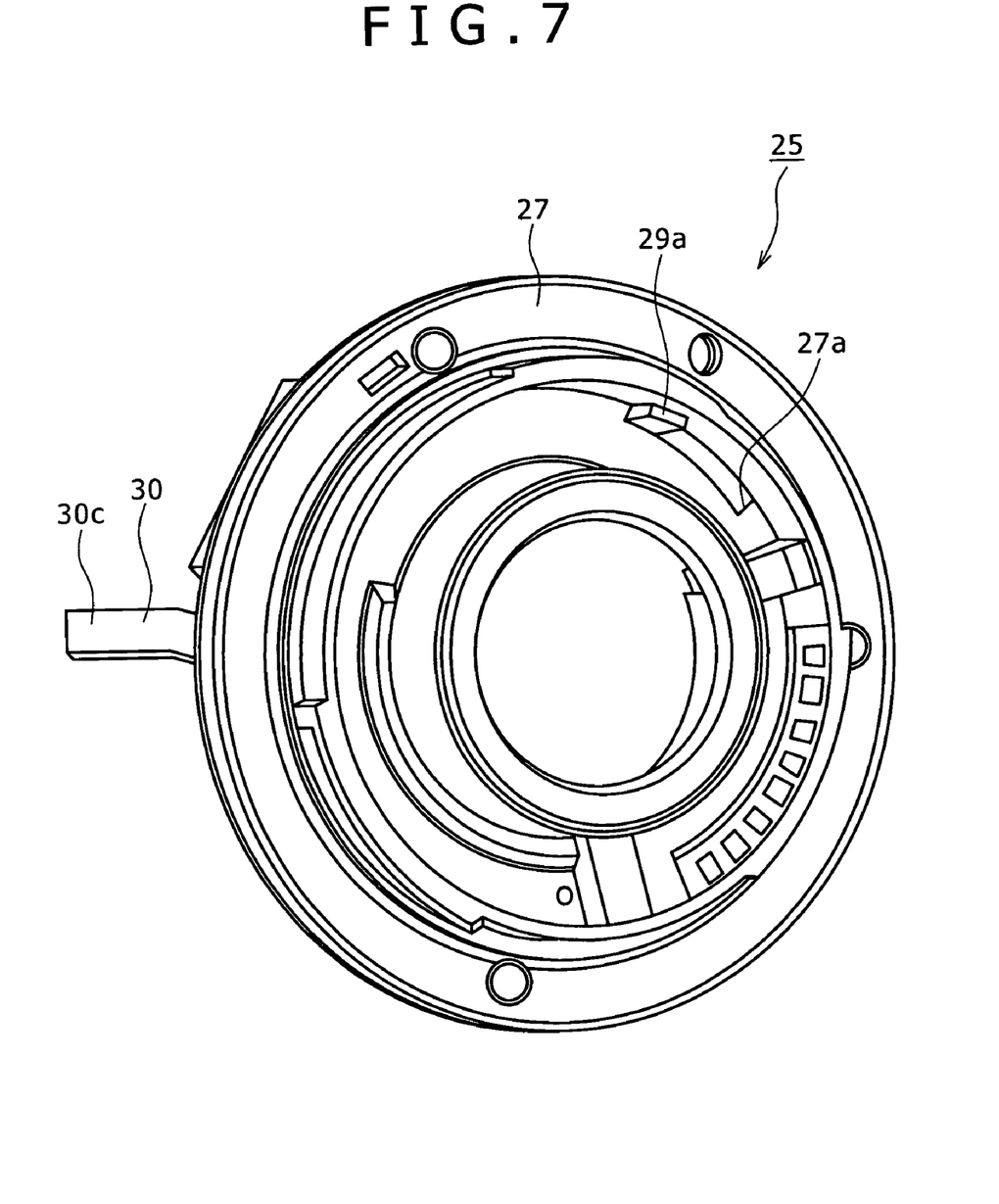
FIG. 7 is an enlarged perspective view showing a construction of a mount unit of the image pickup apparatus of the embodiment shown in FIG. 5.

The mount unit 25 is a unit for mounting the lens barrel 22 to the apparatus main body 21 and is mounted to an end portion (rear end portion) of the lens holding barrel 23 on the object side. The mount unit 25 has a supporting barrel 27 and a preset ring 28. In this case, the supporting barrel 27 is formed into an approximately annular shape. Also, the preset ring 28 is rotatably supported by the supporting barrel 27.

An insertion hole 27a which is formed into a circular shape is formed on a rear surface of the supporting barrel 27 (refer to FIG. 7).

Figure 8:
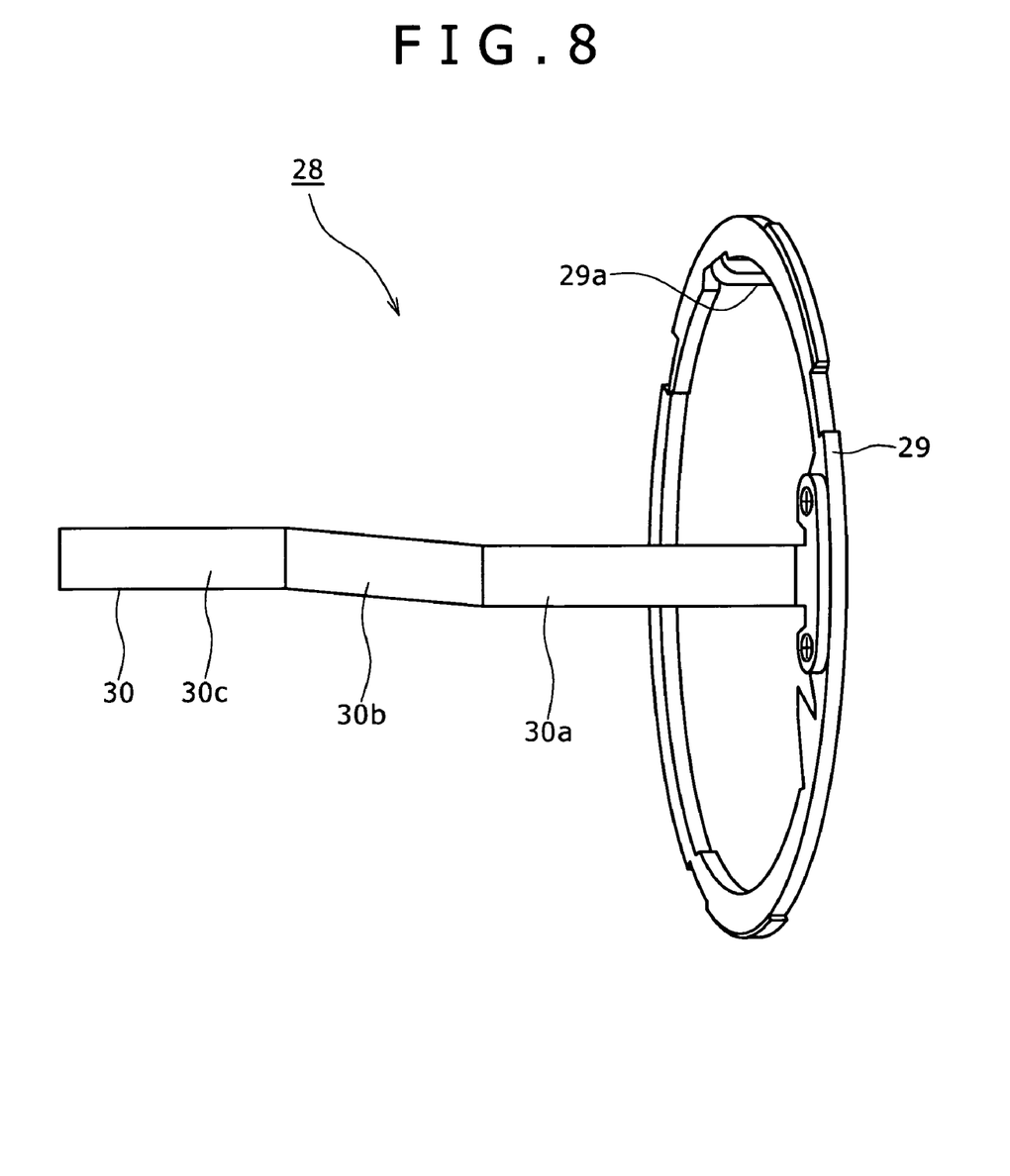
FIG. 8 is an enlarged perspective view showing a construction of a preset ring of the image pickup apparatus of the embodiment shown in FIG. 5.

The present ring 28 has a supported portion 29 which is formed into an annular shape, and a guide protrusion portion 30 which protrudes approximately forward from the supported portion 29 (refer to FIG. 8).

The supported portion 29 is provided with a coupling protrusion 29a which backward protrudes. The coupling protrusion 29a backward protrudes from the insertion hole 27a of the supporting barrel 27 (refer to FIG. 7). The supported portion 29 is urged in one direction in a circumferential direction by a spring member (not shown).

The guide protrusion portion 30 is composed of a base end portion 30a, an intermediate portion 30b, and a head portion 30c. In this case, the base end portion 30a continuously extends back and forth from the supported portion 29. The intermediate portion 30b continuously extends from a front end of the base end portion 30a so as to be inclined with respect to the base end portion 30a. Also, the head portion 30c continuously extends back and forth from a front end of the intermediate portion 30b.

Figure 9:
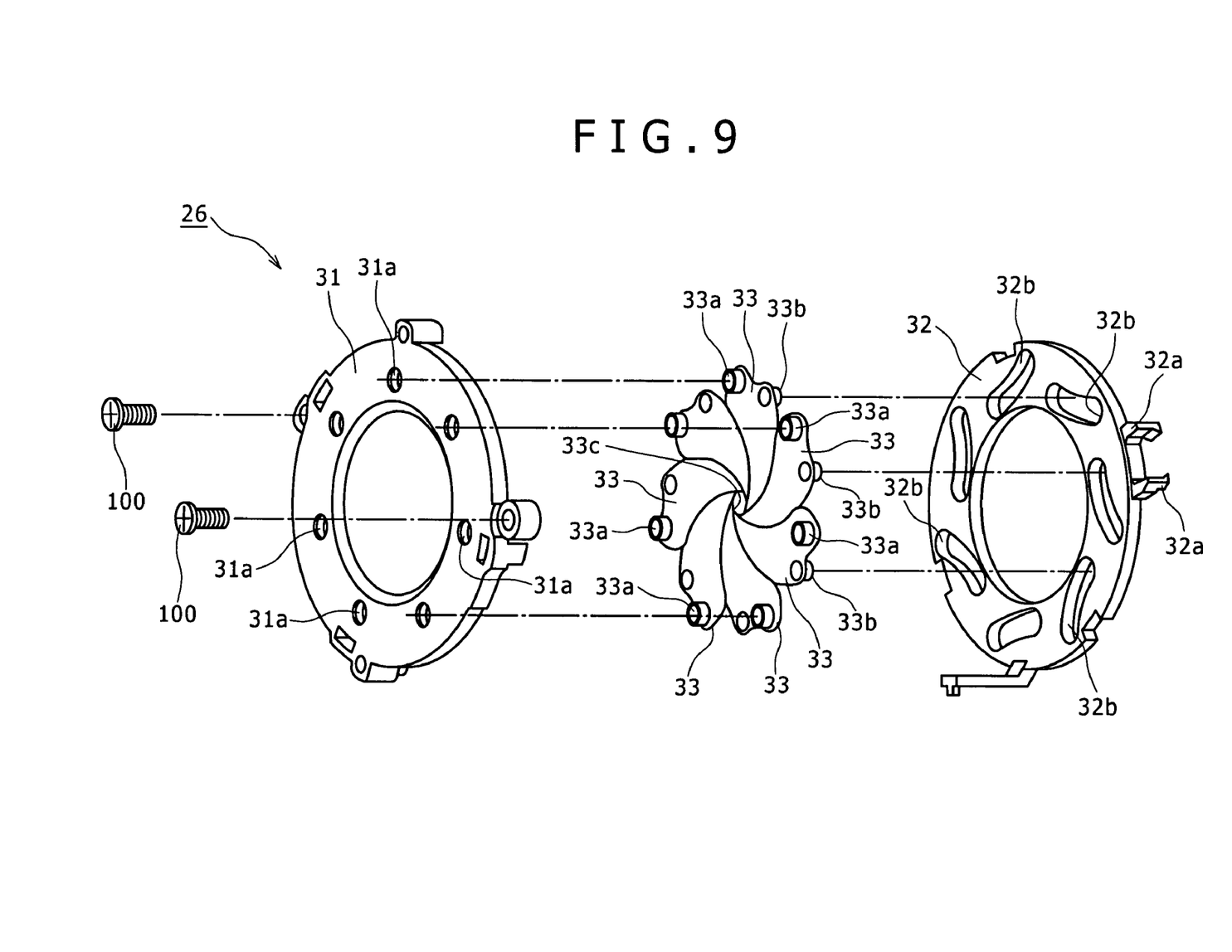
FIG. 9 is an enlarged exploded perspective view showing a construction of a stop unit of the image pickup apparatus of the embodiment shown in FIG. 5.

The stop unit 26, as shown in FIG. 9, is composed of a supporting base 31, a guided base 32, and a plurality of stop vanes 33, 33, . . . . In this case, the supporting base 31 is formed into an approximately annular shape. The guided base 32 is formed into an approximately annular shape and is rotatably supported by the supporting base 31. Also, a plurality of stop vanes 33, 33, . . . are rotatably supported between the supporting base 31 and the guided base 32. Moreover, a plurality of stop vanes 33, 33, . . . function as a stop 2 described above.

A plurality of supporting holes 31a, 31a, . . . are formed in the supporting base 31 so as to be circumferentially separated from one another.

A pair of guided protrusion portions 32a and 32a each protruding outward is provided on a peripheral surface of the guided base 32. A plurality of cum holes 32b, 32b, . . . are formed in the supporting base 31 so as to be circumferentially separated from one another.

The stop vane 33 has a supporting pin 33a which forward protrudes, and a cum pin 33b which backward protrudes. In the stop vane 33, the supporting pin 33a is rotatably supported by the supporting hole 31a of the supporting base 31, and the cum pin 33b is slidably supported by the cum hole 32b of the guided base 32. Therefore, when the guided base 32 is rotated in the circumferential direction with respect to the supporting base 31, the positions of the cum pins 33b, 33b, . . . in the cum holes 32b, 32b, . . . are changed. As a result, the stop vanes 33, 33, . . . are pivoted with respect to the supporting base 31 and the guided base 32 with the supporting pins 33a, 33a, . . . as fulcra, and the size of an opening diameter 33c defined by the stop vanes 33, 33, . . . is changed.

In the stop unit 26, the supporting base 31 is mounted to a movement frame (not shown) which holds the third lens group 13 by mounting screws 100 and 100. Therefore, the stop unit 26 is moved in the optical axis direction integrally with the third lens group 13.

In the stop unit 26, the guided protrusion portions 32a and 32a of the guided base 32 are slidably engaged with the guide protrusion portion 30 provided in the preset ring 28 of the mount unit 25. Therefore, when the stop unit 26 is moved in the optical axis direction integrally with the third lens group 13, the guided base 32 can be rotated with respect to the supporting base 31 in accordance with an engagement position of the guided protrusion portions 32a and 32a with respect to the guided protrusion portion 30.

In a state before the lens barrel 22 is mounted to the apparatus main body 21, in the preset ring 28 of the mount unit 25, the coupling protrusion 29a is held at one end by an urging force of a spring member (refer to FIG. 7). As a result, the opening size 33c defined by the stop vanes 33, 33, . . . is made small to provide a state in which the zoom lens 1 is stopped down to a large degree.

When the lens barrel 22 is mounted to the apparatus main body 21, the coupling protrusion 29a is depressed by a lever (not shown) provided in the apparatus main body 21, and the preset ring 28 is rotated against the urging force of the spring member. When the preset ring 28 is rotated, the guided base 32 engaged with the guide protrusion portion 30 is rotated together with the preset ring 28. As a result, the opening size 33c defined by the stop vanes 33, 33, . . . becomes large to provide a stop releasing state.

In the wide-angle end, the guided protrusion portions 32a and 32a are engaged with a rear end portion of the intermediate portion 30b of the guide protrusion portion 30. In the wide-angle end state, the open F number is set at about F2.8. At this time, the opening size 33c defined by the stop vanes 33, 33, . . . , for example, has an opening area equivalent to a circle with a diameter of 15.274 mm.

In the zoom lens 1, for example, when the zooming is carried out from the wide-angle end toward the telephoto end, the first to fourth lens groups 11 to 14 are moved in the optical axis direction so that the interval between the first lens group 11 and the second lens group 12 increases, the interval between the second lens group 12 and the third lens group 13 narrows, and the interval between the third lens group 13 and the fourth lens group 14 narrows. At this time, the stop unit 26 and the third lens group 13 are moved in the optical axis direction (forward) integrally with each other.

When the stop unit 26 moves in the optical axis direction from the wide-angle end state, the guided base 32 is rotated in the circumferential direction with respect to the supporting base 31 because the guided protrusion portions 32a and 32a are guided to the intermediate portion 30b of the guide protrusion portion 30. Therefore, the opening size 33c defined by the stop vanes 33, 33, . . . becomes large with the forward movement of the stop unit 26. At this time, the open F number is held constant, i.e., at about F2.8. In a state in which the guided protrusion portions 32a and 32a are engaged with the front end of the intermediate portion 30b of the guide protrusion portion 30, the opening size 33c defined by the stop vanes 33, 33, . . . , for example, has an opening area equivalent to a circle with a diameter of 19.702 mm.

When the zooming is further carried out toward the telephoto end, the stop unit 26 and the third lens group 13 are moved in the optical axis direction (forward) integrally with each other, and thus the guided protrusion portions 32a and 32a are guided to the head portion 30c of the guide protrusion portion 30. Therefore, the guided base 32 is not rotated with respect to the supporting base 31, and thus the opening size 33c defined by the stop vanes 33, 33, . . . is held at a given size. At this time, the open F number gradually increases from about F2.8 to become dark, and gets a maximum value of about F3.5.

It is noted that with regard to the brightness on the wide-angle side, for example, the open F number can also be held constant, i.e., at about F2 owing to a factor such as miniaturization of a screen size of the image pickup element.

In addition, although the mechanism for controlling the stop 2 has been described by giving the mechanical mechanism as the example, the mechanism for controlling the stop 2 is by no means limited to the mechanical mechanism. For example, a stop control mechanism utilizing the electromagnetic drive having no transmission of the mechanical motive power may also be used.

Although in the embodiment described above, the image pickup apparatus is applied to the digital still camera, the application range of the image pickup apparatus is by no means limited to the digital still camera. That is to say, the image pickup apparatus can be generally applied to a digital video camera, a mobile phone having a camera incorporated therein, and a camera portion or the like of a digital input-output apparatus such as a Personal Digital Assistant (PDA) having a camera incorporated therein.

The shapes and numeric values of the portions shown in the embodiments described above are each merely an example of the exemplification for carrying out the present invention, and thus the technical scope of the present invention should not be intended to be construed in a limiting sense.

The present application contains subject matter related to that disclosed in Japanese priority Patent Application JP 2008-192364 filed in the Japan Patent Office on Jul. 25, 2008, the entire content of which is hereby incorporated by reference.

What is claimed is:

1. A zoom lens, wherein a stop moves in an optical axis direction in a phase of zooming;
    a position of said stop in a telephoto end is located on an object side with respect to a position of said stop in a wide-angle end;
    an opening size of said stop is controlled in conjunction with the zooming so that an open F number becomes approximately constant in a range from said wide-angle end to a specific intermediate focal length;
    the opening size of said stop is made approximately constant in a range from the specific intermediate focal length to said telephoto end so that the open F number is changed; and
    the specific intermediate focal length fulfills the following conditional expression (1), wide-angle end focal length×1.5<specific intermediate
focal length<telephoto end focal length/1.4  (1).

2. The zoom lens according to claim 1, wherein the opening F number is made brighter than F3 in the range from said wide-angle end to the specific intermediate focal length.

3. The zoom lens according to claim 1, wherein said zoom lens is composed of a first lens group having a positive refracting power, a second lens group having a negative refracting power, a third lens group, having a positive refracting power, which is moved in the optical axis direction integrally with said stop, and a fourth lens group having a positive refracting power, said first to fourth lens groups being arranged in order from the object side;

when the zooming is carried out from the wide-angle side to the telephoto side, an interval between said first lens group and said second lens group increases, an interval between said second lens group and said third lens group narrows, and an interval between said third lens group and said fourth lens group narrows;

in a phase of focusing, said second lens group moves in the optical axis direction; and a zoom factor is set at 3.5× or more.

4. The zoom lens according to claim 3, wherein said second lens group has at least three sheets of concave lenses, and one sheet of convex lens, and at least one surface of said concave lens located closest to the object side, and said convex lens is formed in a form of an aspherical surface.

5. The zoom lens according to claim 3, wherein said first lens group is constructed by arranging a concave lens, a convex lens, and a convex meniscus lens in order from the object side;

said second lens group is constructed by arranging a concave meniscus lens having at least one surface formed in a form of an aspherical surface, a concave lens, a cemented lens of a concave lens and a convex lens having a surface, on an image side, formed in a form of an aspherical surface, and a concave meniscus lens having a concave surface directed to the object side in order from the object side;

said stop is arranged on the object side of said third lens group;

said third lens group is constructed by arranging a double-convex lens, and a cemented lens of a double-convex lens and a concave lens in order from the object side; and said fourth lens group is constructed by arranging a double-convex lens having at least one surface formed in a form of an aspherical surface, a concave meniscus lens having a concave surface directed to the image side, and a cemented lens of a concave lens and a convex lens in order from the object side.

6. A lens barrel, comprising:

a zoom lens; and a lens holding barrel having said zoom lens arranged in an inside thereof;

wherein in said zoom lens, a stop moves in an optical axis direction in a phase of zooming, a position of said stop in a telephoto end is located on an object side with respect to a position of said stop in a wide-angle end, an opening size of said stop is controlled in conjunction with the zooming so that an open F number becomes approximately constant in a range from said wide-angle end to a specific intermediate focal length, the opening size of said stop is made approximately constant in a range from the specific intermediate focal length to said telephoto end so that the open F number is changed, and the specific intermediate focal length fulfills the following conditional expression (1), wide-angle end focal length×1.5<specific intermediate
focal length<telephoto end focal length/1.4  (1).

7. An image pickup apparatus, comprising:

a lens barrel having a zoom lens and a lens holding barrel having said zoom lens arranged in an inside thereof;

an image pickup element for converting an optical image formed by said zoom lens into an electrical signal; and an apparatus main body for holding said lens barrel;

wherein in said zoom lens, a stop moves in an optical axis direction in a phase of zooming, a position of said stop in a telephoto end is located on an object side with respect to a position of said stop in a wide-angle end, an opening size of said stop is controlled in conjunction with the zooming so that an open F number becomes approximately constant in a range from said wide-angle end to a specific intermediate focal length, the opening size of said stop is made approximately constant in a range from the specific intermediate focal length to said telephoto end so that the open F number is changed, and the specific intermediate focal length fulfills the following conditional expression (1), wide-angle end focal length×1.5<specific intermediate
focal length<telephoto end focal length/1.4  (1).

* * * * *